United States Patent
Leidner et al.

(10) Patent No.: US 11,250,439 B2
(45) Date of Patent: Feb. 15, 2022

(54) SYSTEMS AND METHODS FOR SMART CONTRACT INTERVENTION

(71) Applicant: Thomson Reuters Enterprise Centre GmbH, Zug (CH)

(72) Inventors: Jochen Lothar Leidner, London (GB); Tim Nugent, London (GB); Sam Chadwick, Zug (CH)

(73) Assignee: THOMSON REUTERS ENTERPRISE CENTRE GMBH, Zug (CH)

( * ) Notice: Subject to any disclaimer, the term of this patent is extended or adjusted under 35 U.S.C. 154(b) by 521 days.

(21) Appl. No.: 16/133,932

(22) Filed: Sep. 18, 2018

(65) Prior Publication Data

US 2019/0019188 A1    Jan. 17, 2019

Related U.S. Application Data

(63) Continuation-in-part of application No. 15/707,571, filed on Sep. 18, 2017, now Pat. No. 10,984,494.
(Continued)

(51) Int. Cl.
*G06Q 20/40* (2012.01)
*G06Q 30/00* (2012.01)
(Continued)

(52) U.S. Cl.
CPC .......... *G06Q 20/407* (2013.01); *G06Q 20/06* (2013.01); *G06Q 20/065* (2013.01); *G06Q 20/10* (2013.01);
(Continued)

(58) Field of Classification Search
CPC .... G06Q 20/407; G06Q 20/06; G06Q 20/065; G06Q 20/10; G06Q 20/4016; G06Q 30/018
(Continued)

(56) References Cited

U.S. PATENT DOCUMENTS

| | | | |
|---|---|---|---|
| 2007/0061270 A1* | 3/2007 | Seto ................ | G06Q 40/00 705/64 |
| 2009/0271277 A1* | 10/2009 | Bishop .............. | G06Q 20/20 705/21 |

(Continued)

OTHER PUBLICATIONS

Brown, Richard Gendal, "A simple explanation of how money moves around the banking system," published on Nov. 24, 2013, available at: < https://gendal.me/2013/11/24/a-simple-explanation-of-how-money-moves-around-the-banking-system/ > (Year: 2013).*

(Continued)

*Primary Examiner* — Richard W. Crandall
(74) *Attorney, Agent, or Firm* — Norton Rose Fulbright US LLP

(57) ABSTRACT

A method of remedying erroneous transactions in a distributed ledger system may include: determining, by a court system associated with the distributed ledger system, a judgment that a transferring, by a contract of the distributed ledger system during a conducting of a financial transaction, of a quantity of tokens of the distributed ledger system, from a first account corresponding to a first counterparty to a second account corresponding to a second counterparty, is erroneous; and in response to determining the judgment, executing, by a court contract of the distributed ledger system, a transfer function, configured to be responsive to the court contract, to transfer at least a portion of the quantity of tokens from the second account to the first account.

19 Claims, 8 Drawing Sheets

Related U.S. Application Data

(60) Provisional application No. 62/560,447, filed on Sep. 19, 2017, provisional application No. 62/396,293, filed on Sep. 19, 2016.

(51) Int. Cl.
*G06Q 20/06* (2012.01)
*G06Q 20/10* (2012.01)

(52) U.S. Cl.
CPC ....... *G06Q 20/4016* (2013.01); *G06Q 30/018* (2013.01)

(58) Field of Classification Search
USPC .......................................................... 705/311
See application file for complete search history.

(56) References Cited

U.S. PATENT DOCUMENTS

| | | | | |
|---|---|---|---|---|
| 2010/0262538 A1* | 10/2010 | Rosenberger | .......... | G06Q 30/04 705/40 |
| 2015/0379510 A1 | 12/2015 | Smith | | |
| 2016/0092988 A1 | 3/2016 | Letourneau | | |
| 2016/0321751 A1* | 11/2016 | Creighton, IV | ....... | G06Q 40/04 |
| 2017/0046694 A1 | 2/2017 | Chow et al. | | |
| 2017/0236120 A1* | 8/2017 | Herlihy | ................... | G06F 21/57 705/67 |
| 2017/0243025 A1 | 8/2017 | Kurian et al. | | |
| 2018/0025435 A1* | 1/2018 | Karame | ................ | H04L 9/3236 705/30 |
| 2018/0062848 A1* | 3/2018 | Gorman | ................ | H04L 9/3239 |
| 2018/0285971 A1* | 10/2018 | Rosenoer | ............ | G06Q 40/025 |

OTHER PUBLICATIONS

Lumb, Richard, "Downside of Bitcoin: A Ledger that Can't Be Corrected," New York Times, Sep. 9, 2016, available online at: < https://www.nytimes.com/2016/09/10/business/dealbook/downside-of-virtual-currencies-a-ledger-that-cant-be-corrected.html > (Year: 2016).*

International Search Report and Written Opinion dated Dec. 19, 2017, of the corresponding International Application PCT/IB2017/055639 filed Sep. 18, 2017, 12 pages.

International Search Report and Written Opinion dated Nov. 29, 2018, of the corresponding International Application PCT/IB2018/057182 filed Sep. 18, 2018, 11 pages.

* cited by examiner

SYSTEMS AND METHODS FOR SMART CONTRACT INTERVENTION

CROSS REFERENCE TO RELATED APPLICATIONS

This application claims priority to U.S. Provisional Patent Application No. 62/560,447, filed on Sep. 19, 2017; and also is a continuation-in-part of and claims priority to U.S. patent application Ser. No. 15/707,571, filed on Sep. 18, 2017, which claims priority to U.S. Provisional Patent Application No. 62/396,293, filed on Sep. 19, 2016; each of the above applications being hereby incorporated by reference herein in their entireties.

BACKGROUND INFORMATION

Distributed ledger systems provide a platform for the execution of smart contracts. Smart contracts typically include program instructions that may be executed in response to a transaction in the distributed ledger system addressed to the contract. Smart contracts may also represent legal contracts between users, with program functions of the smart contracts implementing terms, conditions, etc. of the legal contract.

Properties of distributed ledger systems provide improved immutability of data, such as transactions and smart contracts of such systems, ensuring that such data may be written to the system but not tampered with. Implementing legal contracts and other functionality using smart contracts thus provides a highly reliable way to implement such functions.

Unfortunately, problems exist with the execution of smart contracts in distributed ledger systems. For example, a legal contract represented by the smart contract may represent an illegal transaction in some jurisdictions. Additionally, the smart contract may include logical errors that cause it to execute a transaction different from that agreed to by parties to the legal contract. However, the immutability of the transactions, contracts, etc. provided by the distributed ledger system may be a barrier to actions to stop execution of such a contract.

Thus, a need exists for systems and methods to provide improved intervention in the operation of smart contracts in a distributed ledger system.

BRIEF DESCRIPTION OF THE DRAWINGS

So that the features of the present invention can be understood, a number of drawings are described below. However, the appended drawings illustrate only particular embodiments of the invention and are therefore not to be considered limiting of its scope, for the invention may encompass other equally effective embodiments.

DETAILED DESCRIPTION OF EXAMPLE EMBODIMENTS

Intervening in the operation of a smart contract in a distributed ledger system may include launching execution of the smart contract; upon launching execution of the smart contract, executing a judgment checking function to determine whether a judgment against the smart contract exists in a judgment database; in response to a judgment against the smart contract existing in the judgment database, intervening in the operation of the smart contract to prevent the execution of the smart contract; and, in response to no judgment against the smart contract existing in the judgment database, continuing execution of the smart contract.

Intervening in the operation of a smart contract in a distributed ledger system also may include determining a judgment of a validity of a complaint against the smart contract based on input received from one or more judges; in response to the judgment upholding the validity of the complaint against the smart contract, recording the judgment in a judgment database; receiving a request, from a judgment checking function, to determine whether the judgment against the smart contract exists in the judgment database in response to launching execution of the smart contract; and responding to the request indicating whether the judgment exists in the judgment database.

Figure 1:
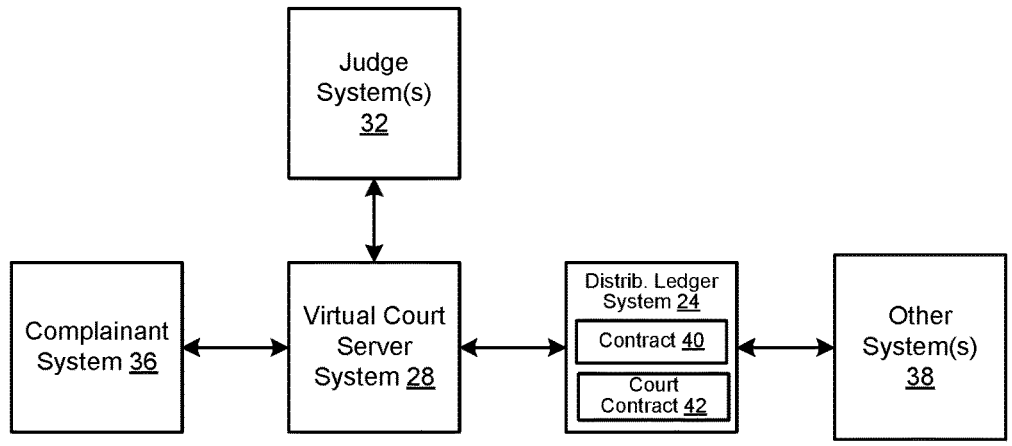
FIG. 1 is a schematic diagram depicting an embodiment of a system for providing intervention in the operation of a smart contract in a distributed ledger system.

FIG. 1 depicts an embodiment of a system 20 for providing improved intervention in the operation of smart contracts in a distributed ledger system. The system 20 includes a distributed ledger system 24, a virtual court server system 28, one or more judge systems 32, one or more complainant system(s) 36, and one or more other systems 38. The distributed ledger system 24 provides a platform for the operation of smart contracts, including a first smart contract 40 for which a judgment may be evaluated, and a second smart contract 42, also referred to herein as a court contract 42, which may be utilized to implement a judgment against the smart contract 40. The virtual court server system 28 receives complaints regarding the operation of the smart contract 40 from the complainant system 36, receives one or more inputs regarding the complaint from the judge systems 32, and provides mechanisms for intervention in the operation of the smart contract 40 in the distributed ledger system 24, such as maintaining a judgment database and/or communicating with the court contract 42. The other system 38 may also interact with the distributed ledger system 24, such as, e.g., interacting with smart contracts of the distributed ledger system 24.

In embodiments, the system for providing improved intervention in the operation of smart contracts may include only any subset of, or an alternative connection of, the features depicted in or discussed herein in regard to FIG. 1.

Figure 2:
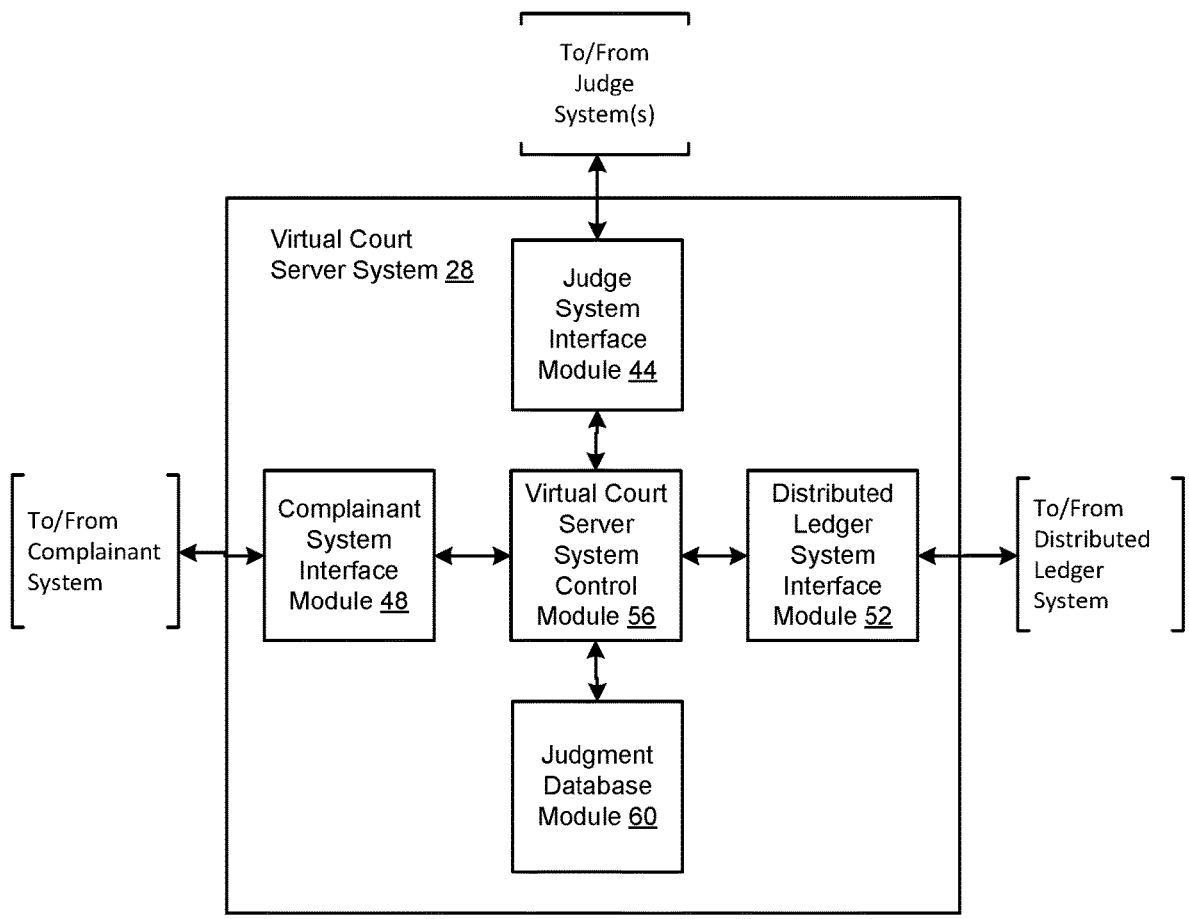
FIG. 2 is a schematic diagram depicting an embodiment of a virtual court server system.

FIG. 2 depicts an embodiment of the virtual court server system 28, including a judge system interface module 44, a complainant system interface module 48, a distributed ledger system interface module 52, a virtual court server system control module 56, and a judgment database module 60. The complainant system interface module 48 provides a communication interface between the virtual court server system 28 and the complainant system 36 to receive complaint information from the complainant system 36. The judge system interface module 44 provides a communication interface between the virtual court server system 28 and the judge systems 32 to communicate complaint information to the judge systems 32 and receive judgment information from the judge systems 32. The distributed ledger system interface module 52 provides a communication interface between the distributed ledger system 24 and the virtual court server system 28 to provide enforcement mechanisms for intervention in the operation of the smart contract 40, such as maintaining the judgment database and/or communicating with the court contract 42. The virtual court server system control module 56 provides control logic to implement functions of the virtual court server system 28 discussed herein. The judgment database module 60 provides a judgment database for storage for and access to the judgments against the smart contract 40. The judgment database may instead or additionally be stored in the distributed ledger system 24, such as in the form of a data structure of the court contract 42.

In embodiments, the virtual court server system may include only any subset of, or an alternative connection of, the features depicted in or discussed herein in regard to FIG. 2.

Figure 3:
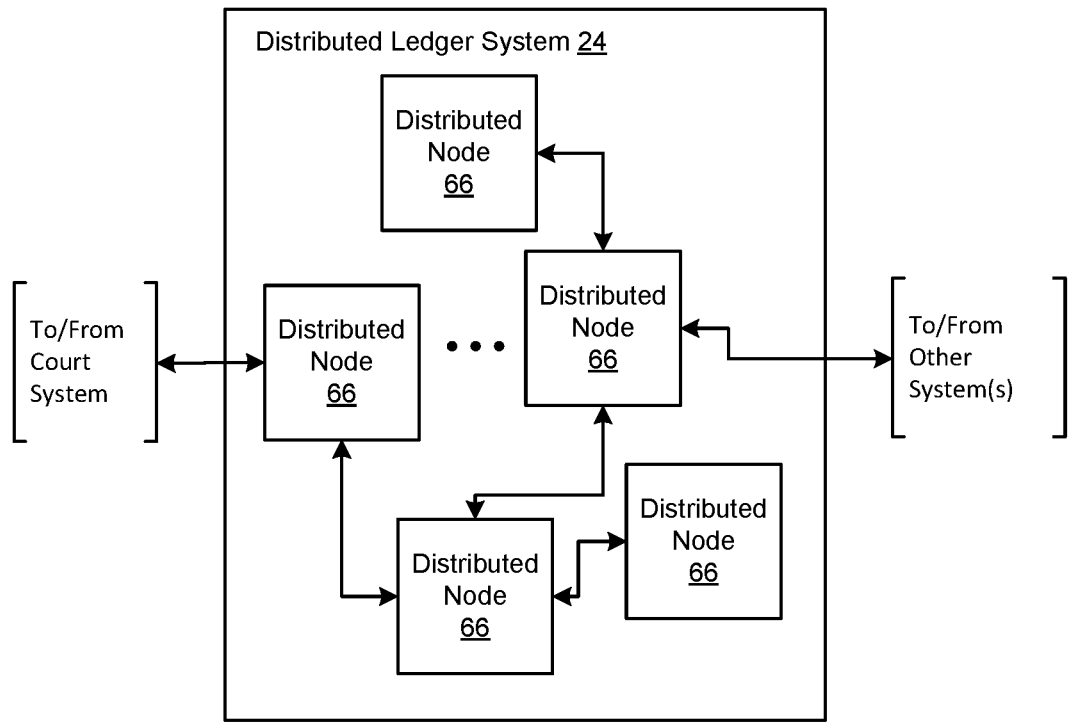
FIG. 3 is a schematic diagram depicting an embodiment of the distributed ledger system.

FIG. 3 depicts an exemplary embodiment of the distributed ledger system 24. The distributed ledger system 24 includes a plurality of distributed nodes 66. The distributed nodes 66 are organized as a peer-to-peer network, in which each of the nodes 66 may connect to one or more of the other nodes 66 using a peer-to-peer communication protocol. At least one of the distributed nodes 66 may also connect to the virtual court server system 28. At least one of the distributed nodes 66 also may connect to the other system 38. As a peer-to-peer network, the configuration of connections between individual distributed nodes 66 may change over time according to operation of the peer-to-peer protocol.

Figure 4:
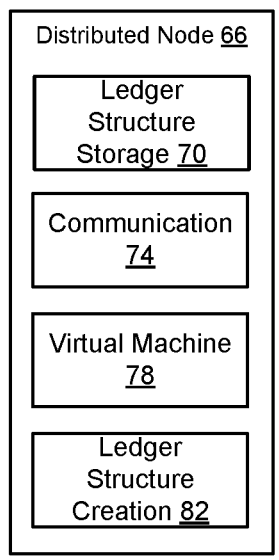
FIG. 4 is a schematic diagram depicting an embodiment of a distributed node of the distributed ledger system.

FIG. 4 depicts an exemplary embodiment of the distributed node 66 of the distributed ledger system 24, including a ledger structure storage module 70, a communication module 74, a virtual machine module 78, and a ledger structure creation module 82. The ledger structure storage module 70 stores data structures into which the ledger of the distributed ledger system 24 is organized in a non-transitory machine-readable storage medium. The communication module 74 performs communications between the distributed node 66 and other distributed nodes 66 and other systems or components connected to the distributed node 66, such as the virtual court server system 28. The virtual machine module 78 executes smart contracts stored on the distributed ledger of the distributed ledger system 24. The ledger structure creation module 82 performs an algorithm to incorporate new transactions and other data into ledger structures of the distributed ledger system 24, such as a data encryption algorithm of a selected complexity.

In embodiments, the distributed node may include only any subset of, or an alternative connection of, the features depicted in or discussed herein in regard to FIG. 4.

In embodiments, the distributed ledger system 24 may be a blockchain system in which the ledger implemented by the distributed ledger system 24 is in the form of a sequence of structured data blocks, also referred to as a blockchain. In such embodiments, the ledger structure storage module 70 is a block storage module that stores the blocks of the blockchain system, and the ledger structure creation module 82 is a block creation module performing an algorithm to incorporate new transactions and other data into blocks of the blockchain of the blockchain system, also referred to as mining blocks of the blockchain system. In other embodiments, the distributed ledger system 24 may be another type of distributed ledger system instead of a blockchain system, in which the ledger may be organized into a structure other than blocks of a blockchain.

Components of embodiments of the system 20 for providing an improved intervention in the operation of the smart contract 40 in the distributed ledger system 24, such as the virtual court server system 28, the judge system(s) 32, the complainant system(s) 36, the other system(s) 38, nodes 66 of the distributed ledger system 24, etc., and/or any individual one, subset, or all of the components thereof, may be implemented as hardware, software, or a mixture of hardware and software. For example, each of the virtual court server system 28, the judge system(s) 32, the complainant system(s) 36, the other system(s) 38, nodes 66 of the distributed ledger system 24, etc., and/or any individual one, subset, or all of the components thereof, may be implemented using a processor and a non-transitory storage medium, where the non-transitory machine-readable storage medium includes program instructions that when executed by the processor perform embodiments of the functions of such components discussed herein. In embodiments, each of the virtual court server system 28, the judge system(s) 32, the complainant system(s) 36, the other system(s) 38, nodes 66 of the distributed ledger system 24, etc., and/or any individual one, subset, or all of the components thereof, may be implemented using a computer system, such as, e.g., a desktop computer, laptop computer, mobile computing device, network device, server, Internet server, cloud server, etc.

Components of embodiments of the system 20 for providing an improved intervention in the operation of the smart contract 40 in the distributed ledger system 24, such as the virtual court server system 28, the judge system(s) 32, the complainant system(s) 36, the other system(s) 38, nodes 66 of the distributed ledger system 24, etc., and/or any individual one, subset, or all of the components thereof, may each be connected to, and communicate with, other components of embodiments of the system 20, e.g., as indicated by the connections exemplarily depicted in FIG. 1, over one or more communication networks represented by such connections.

Figure 5:
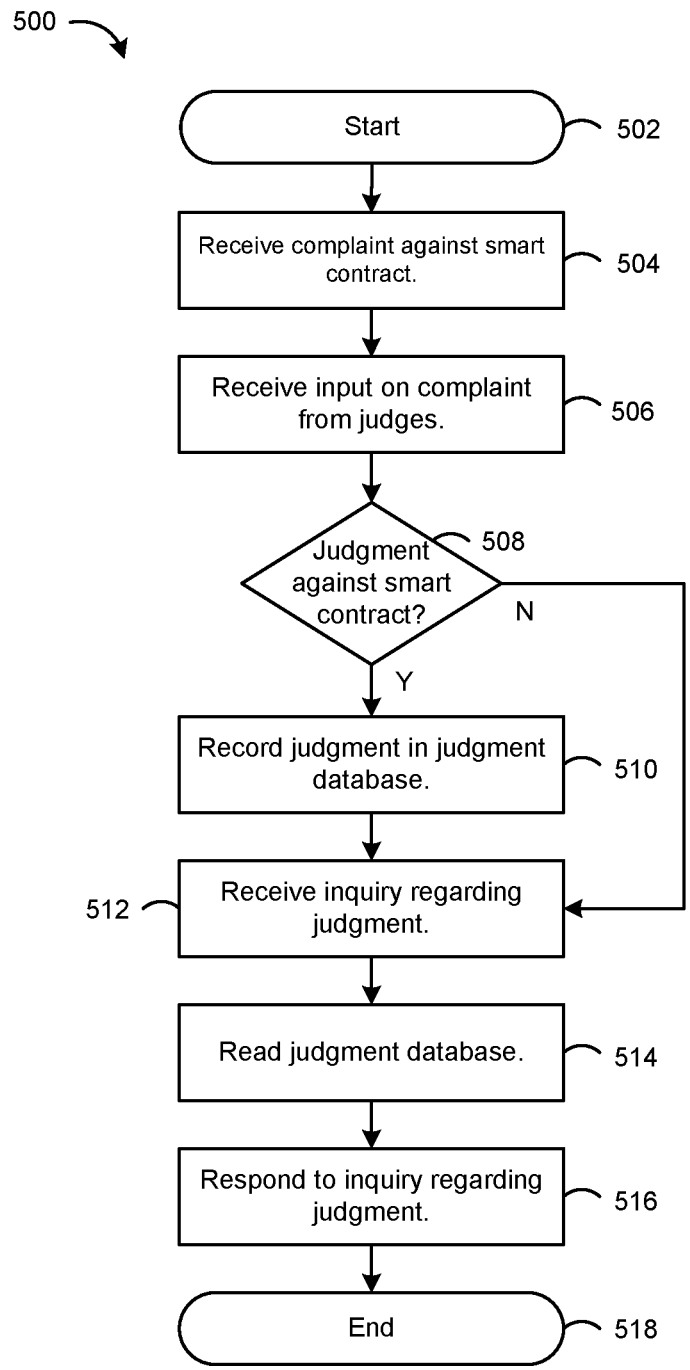
FIG. 5 is a flowchart depicting an embodiment of a method of determining a judgment for the smart contract.

FIG. 5 depicts an embodiment of a method 500 of intervening in the operation of the smart contract 40 in the distributed ledger system 24. The method 500 begins at step 502.

At step 504, a complaint is received regarding the smart contract 40 from a complainant. The complaint contains information alleging an illegality or other problem with the operation of the smart contract 40. The complaint includes an identifier identifying the smart contract 40, such as an address of the smart contract 40 in the distributed ledger system 24, and one or more assertions that the smart contract 40 has violated a legal rule. For example, the complaint may identify a legal jurisdiction, such as a state or country, etc., identify a law or rule of the identified legal jurisdiction, such as a rule related to the conducting of financial transactions, etc., and assert that the smart contract 40 violates the identified law. In another example, the complaint may identify a portion of a legal contract between a person or system originating the complaint and the owner or operator of the smart contract 40, which legal contract the smart contract 40 is intended to implement, and assert that the smart contract 40 implements something other than the identified portion of the legal contract.

The complaint is received at the virtual court server system 28 from a complainant operating the complainant system 36. For example, the complainant may transmit a file containing the complaint to the virtual court server system 20 via the complainant system interface module 48.

The complainant is a person or other legal entity, such as a corporation, etc., that asserts the illegality or other problem against the smart contract 40. The complainant typically has interacted with the smart contract 40 and observed the asserted illegality or other problem, and is turning to the system 20 for intervention in the operation of smart contracts for relief, much in a similar way to how a complainant turns to a court of a jurisdiction for relief for a legal complaint.

The virtual court server system 28 is typically operated by an organization or other entity with a mandate to conduct intervention in the operation of smart contracts in the distributed ledger system 24. For example, the virtual court server system 28 may be operated by an organization that created or operates the distributed ledger system 24. Providing the virtual court server system 28 and the intervention functionality discussed herein provides advantageous properties to the distributed ledger system 24, such as an improved likelihood of legal operation and redress of legal problems, which the operator of the distributed ledger system 24 can advertise to increase the business conducted by the distributed ledger system 24.

At step 506, input regarding the complaint is received from one or more judges. The input contains information regarding a judgment of the complaint. For example, the received input may include a vote from each of the one or more judges as to whether the complaint is agreed with and/or valid, and the judgment being that the smart contract 40 is illegal or has the indicated problem, or whether the complaint is disagreed with and/or invalid, and the judgment being that the smart contract 40 is not illegal or does not include the identified problem.

The input regarding the complaint is received at the virtual court server system 28 from the one or more judges operating the one or more judge systems 32. For example, a judge may transmit a file or other data containing the input regarding the complaint to the virtual court server system 28 via the judge system interface module 44.

The one or more judges are people or other legal entities, such as corporations, etc., elected or otherwise designated within the operation of the distributed ledger system 24 to pass judgment on complaints. For example, the judges may be elected via an election by users or other stakeholders in the distributed ledger system 24. The judges are typically required to satisfy one or more criteria to run for election, such as being authenticated users of the distributed ledger system 24, submitting an application to be a judge, etc. In another example, the judges are appointed by the organization or other entity with the mandate to conduct intervention in the operation of smart contracts, such as the organization that created or operates the distributed ledger system 24.

In embodiments, the one or more judges providing input may include a predetermined number of judges organized according to one or more of a geographic region, a legal jurisdiction, a smart contract type, a legal rule type, etc.

At step 508, a judgment of the complaint is determined based on the received input. The determined judgment includes whether the complaint is upheld, in whole or part, and the smart contract 40 judged illegal or having the indicated problem, or whether the complaint is dismissed, and the smart contract 40 judged to not be illegal or have the indicated problem. The determination is performed by combining the inputs received from the one or more judges. For example, the determination may be performed by adding together votes received from the one or more judges, and then determining whether a threshold has been reached regarding a judgment for the contract. The threshold may selected according to various different voting systems. In one example, the threshold is whether one of the options for the judgment, i.e., it being upheld or dismissed, reaches a plurality of the votes of the one or more judges. In another example, the threshold is whether one of the options for the judgment reaches a majority of the votes of the one or more judges.

The determination is conducted by the virtual court server system based on the received input from the one or more judges, such as by the control module acting on the inputs received via the judge system interface module.

If at step 508, it is determined that the judgment is that the smart contract 40 has the illegality or other problem indicated in the complaint, the method proceeds to step 510. At step 510 the determined judgment is recorded in a judgment database. The judgment database may be stored in the virtual court server system 28 and/or in the distributed ledger system 24.

In embodiments in which the judgment database is stored in the judgment database module 60 of the virtual court server system 28, the determined judgment is recorded in the judgment database module 60. In such embodiments, the judgment is recorded by the virtual court server system 28, such as by the control module 56 storing the judgment in the judgment database module 60. The judgment database module 60 provides a database to store and provide access to the judgments of smart contracts. To record a judgment, the control module 56 provides as inputs to a write function of the judgment database module 60 an identifier of the smart contract 40, such as an address of the smart contract 40, and the judgment.

Figure 6:
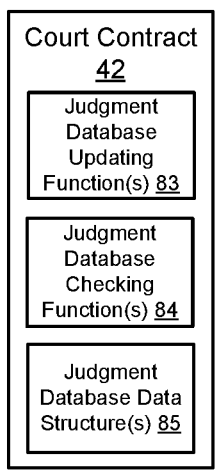
FIG. 6 is a schematic diagram depicting an embodiment a court smart contract.

In embodiments in which the judgment is stored in a judgment database in the distributed ledger system 24, the judgment may be recorded in a data structure of the distributed ledger system 24 representing the judgment database using a smart contract of the distributed ledger system 24, such as the court contract 42. FIG. 6 depicts an embodiment of the court contract 42, including one or more judgment database updating functions 83, one or more judgment database checking functions 84, and one or more judgment database data structures 85. The judgment database updating function 83 includes program instructions to execute a write to the judgment database data structure 85, which contains the judgment database. The write can include as an input an identification of the smart contract 40, such as an address of the smart contract 40, and the judgment, such as, e.g., a Boolean or integer value indicating that a judgment against the smart contract 40 exists, and as a result of its execution record the identifiers of the contract 40 and judgment as a corresponding pair of data values in the data structure 85.

To record the judgment, the virtual court server system 28 generates and transmits, such as via the distributed ledger system interface module 52, to at least one distributed node 66 of the distributed ledger system 24 a transaction addressed to the court contract 42 invoking the judgment database updating function 83. In response, upon incorporation by at least one distributed node 66 of the transaction into a ledger structure of the distributed ledger system 24, the court contract is executed to execute the judgment database updating function 83 to record the judgment in the judgment database data structure 85 of the court contract 42.

Below are exemplary program instructions illustrating an example embodiment of the court contract 42:

```
contract Court {
    address owner;
    mapping(address => bool) isLegal;
    function Court( ){
        owner = msg.sender;
    }
    function updateStatus(address a, bool b) {
        if(msg.sender == owner){
            isLegal[a] = b;
        }else{
            throw;
        }
    }
    function checkStatus(address a) returns (bool) {
        return isLegal[a];
    }
}
```

Other embodiments of the court contract 42 may include different specific program instructions. The exemplary contract Court{ } includes an isLegal[ ] data structure, an updateStatus( ) function, and a checkStatus( ) function. In the exemplary embodiment, the judgment database is implemented using the isLegal[ ] data structure, and the judgment database updating function is implemented using the updateStatus( ) function. Upon being invoked by a transaction to the Court{ } contract, the updateStatus( ) function updates the isLegal[ ] data structure with a judgment b for an indicated address when the function is triggered by a transaction from the court contract owner.

In embodiments, the court contract 42 may include only any subset of, or an alternative connection of, the features depicted in or discussed herein in regard to FIG. 6.

Returning to FIG. 5, if at step 508, it is determined that the judgment is that the smart contract 40 does not have the illegality or other problem indicated in the complaint, the method proceeds to step 512.

At step 512, an inquiry is received regarding whether a judgment against the smart contract 40 exists. The inquiry includes an identifier identifying the smart contract 40, such as an address of the smart contract 40 in the distributed ledger system 24, and a request for identification of any judgments against the smart contract 40. The inquiry may be received by a component of the virtual court server system 28 or the distributed ledger system 24. In embodiments in which judgments are stored in the judgment database module 60, the inquiry is received by the virtual court server system 28. For example, the inquiry may be received via the distributed ledger system interface module 52. In embodiments in which judgments are stored in a data structure of the distributed ledger system 24, the inquiry may be received by a smart contract such as the court contract 42. For example, returning to FIG. 6, the inquiry may be received by the court contract 42 as part of it being executed to perform the judgment database checking function 84. The judgment database checking function 84 includes program instructions to execute a read of the judgment database data structure 85, which contains the judgment database. In the exemplary contract Court{ } discussed above, this may take the form of a call to or invocation of the checkStatus( ) function.

The inquiry is received from and/or initiated by a component of the distributed ledger system 24 in response to launching or requesting to launch execution of the smart contract 40. For example, the inquiry may be received from and/or initiated by the smart contract 40 itself, such as a result of execution of at least one program instruction of the smart contract 40, or received from and/or initiated by the virtual machine 78 of a distributed node 66 of the distributed ledger system 24 that is launching execution of the smart contract 24. Embodiments of generating the inquiry are discussed further below in regard to embodiments of the method 600 of intervening in the operation of the smart contract 40.

At step 514, the judgment database is read to determine whether any judgment against the smart contract 40 has been recorded in the judgment database. The judgment database may be read by a component of the virtual court server system 28 or the distributed ledger system 24. In embodiments in which judgments are stored the judgment database module 60, to read the judgment database, the control module 56 provides as inputs to a read function of the judgment database module 60 an identifier of the smart contract 40, such as an address of the smart contract 40. In embodiments in which judgments are stored in the judgment database data structure 85 of the court contract 42 in the distributed ledger system 24, the court contract 42 may be executed to perform the judgment database checking function 84 to perform a read of the data structure 85 for any judgments associated with the contract 40. The read can include as an input an identification of the smart contract 40, such as an address of the smart contract 40, and as a result of its execution return any judgment, such as, e.g., a Boolean or integer value indicating that a judgment against the smart contract 40 exists, stored in the data structure 85 in association with the identifier of the smart contract 40. In the exemplary contract Court{ } discussed above, this make take the form of executing the checkstatus( ) function to perform a read of the isLegal[ ] data structure for a judgment value corresponding to the address a.

At step 516, a response to the inquiry is provided to the requesting component. The response indicates whether any judgment against the indicated smart contract 40 exists in the judgment database. In embodiments in which the virtual court server system 28 performs the read of the judgment database stored in the judgment database module 60, the response is transmitted by the virtual court server system 28. For example, the response may be transmitted by the virtual court server system control module 56 via the distributed ledger system interface module 52.

The response is transmitted to the requesting component of the distributed ledger system 24. For example, the response may be transmitted to the smart contract 40 or virtual machine 78 of the distributed ledger system 24 that initiated the inquiry. In embodiments in which the response is transmitted to the smart contract 30, the virtual court server system 56 may generate a transaction containing the response and transmit the transaction to at least one node 66 of the distributed ledger system 24. The transaction may be addressed to the smart contract 40, or to another smart contract acting as an intermediary, such as an oracle, for the smart contract 40. In the case of using an intermediary or oracle contract, the intermediary or oracle contract may transmit a second transaction to or execute a call to the requesting smart contract 40 to deliver the response, or alternatively the requesting smart contract 40 may transmit a transaction to or execute a call to the intermediary or oracle contract to retrieve the response. In embodiments in which the response is transmitted to the virtual machine 78, the virtual court server system 28 may provide a communication to the virtual machine module 78 of a distributed node 66 of the distributed ledger system 24 containing the response, such as via the distributed ledger system interface module 52.

In embodiments in which the court contract 42 performs the read of the judgment database stored in the judgment database data structure 85 of the court contract 42, the court contract outputs the response. For example, the court contract 42 may be invoked by the smart contract 40 to perform the judgment database checking function 84, and output the result of the read of the judgment database data structure 85 to the smart contract 40. In the exemplary contract Court{ } discussed above, this may take the form of the checkstatus( ) function outputting the result of this function to the invoking smart contract.

In embodiments, a method of determining a judgment for a smart contract in a distributed ledger system may include only any subset of, or an alternative ordering of, the features depicted in or discussed above in regard to FIG. 5.

Figure 7:
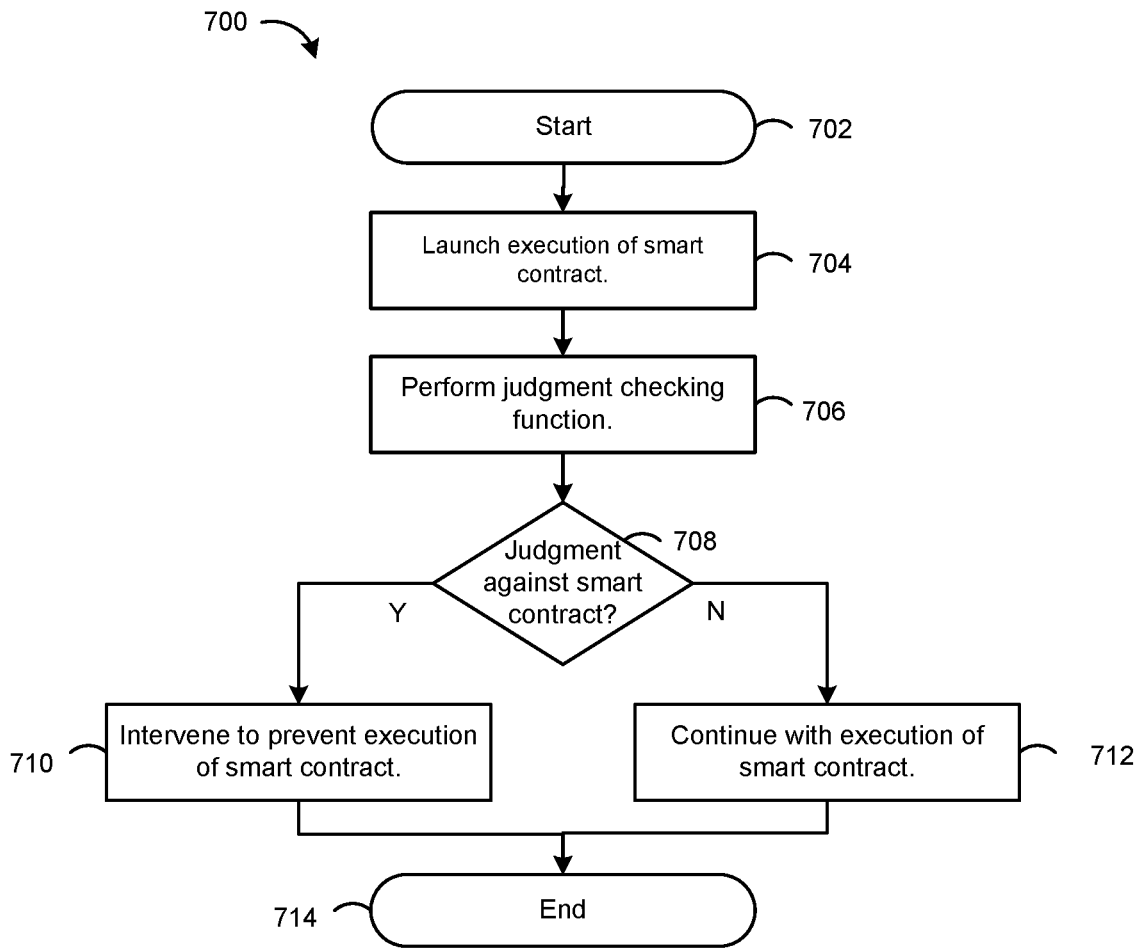
FIG. 7 is a flowchart depicting an embodiment of a method of intervening in the operation of the smart contract based on the judgment.

FIG. 7 depicts an embodiment of another method 700 of intervening in the operation of the smart contract 40 based on the judgment for the smart contract 40. The method 700 of intervening in the operation of the smart contract 40 may be complimentary to the method 500 of intervening in the operation of the smart contract 40. For example, the method 500, or portions thereof, may be performed by a first set of components, such as one or more components of the virtual court server system 28 and/or distributed ledger system 24, as discussed herein, and the method 700, or portions thereof, may be performed by a second set of components, such as one or more components of the virtual court server system 28 and/or distributed ledger system 24, as discussed herein, in concert with the performance of the method 500. The method 600 begins at step 702.

At step 704, execution of the smart contract 40 is launched or requested to be launched. Execution of the smart contract 40 is launched in response to events in the distributed ledger system 24. In one example, execution of the smart contract 24 is launched in response to a transaction addressed to the smart contract 40 being transmitted to a node 66 of the distributed ledger system 24, such as by a component of a distributed application of which the smart contract 40 is a part, or in response to a call to the smart contract 40 that does not require a transaction, such as by another smart contract or other component. Execution of the smart contract 40 is performed by the virtual machine module 78 of at least one distributed node 66 of the distributed ledger system 24.

At step 706, a judgment checking function is executed. The judgment checking function checks whether a judgment against the smart contract exists in the judgment database, such as in the judgment database module 60 or the judgment database data structure 85 of the court contract 42. The judgment checking function is executed prior to other, non-judgment-checking functions of the smart contract 40, so that if a judgment against the smart contract 40 exists, intervention in the operation of the smart contract 40 can be performed before such other functions of the smart contract 40 are executed. The judgment checking function may be or include a function of a contract of the distributed ledger system 24, such as the court contract 42 or the smart contract 40; a function of another component of the distributed ledger system 24, such as the virtual machine 78 of a distributed node 66 of the distributed ledger system 24; a function of a component of the virtual court server system 28; or combinations thereof.

Figure 8:
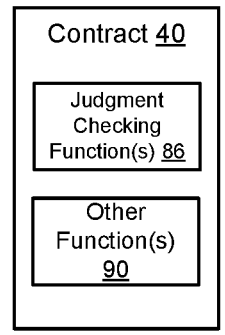
FIG. 8 is a schematic diagram depicting an embodiment of the smart contract.

In embodiments, the judgment checking function is or includes a function of a contract of the distributed ledger system 24, such as the court contract 42, invoked by the smart contract 40, which checks a judgment database stored as a data structure of such a contract, such as the judgment database data structure 85. FIG. 8 depicts an embodiment of the smart contract 40 including one or more judgment checking functions 86 and one or more other functions 90. The one or more other functions 90 include program instructions to perform other functionality of the smart contract 40, such as in a role as part of a distributed application. In embodiments, the judgment checking function 86 includes program instructions to invoke another contract of the distributed ledger system, such as the court contract 42, to check whether a judgment for the smart contract 40 exits in a data structure of such a contract, such as the judgment database data structure 85. For example, to perform the judgment checking function, the smart contract 40 may execute the judgment checking function 86, which may invoke the court contract 42 to perform the judgment database checking function 84, which determines whether a judgment exists for the smart contract 40 in the data structure 85 of the court contract 42. The invocation of the court contract 42 by the smart contract 40 may communicate as an input to the judgment database checking function 84 an identification of the smart contract 40, such as an address of the smart contract 40, and output as a result of the execution of the judgment database checking function 84 an indication of whether a judgment exists against the smart contract 40.

Below are exemplary program instructions illustrating an example embodiment of the smart contract 40:

```
contract someContract {
    Court court;
    function someContract(address a){
        court = Court(a);
    }
    function someFunction( ){
        if(court.checkStatus(this)){
            // Contract is legal - do stuff
        }else{
            throw;
        }
    }
}
```

Other embodiments of the smart contract 40 may include different specific program instructions. The exemplary contract someContract{ } includes functions someContract( ) and someFunction( ). The function someContract( ) may be executed upon launching, and invokes an instance of the Court{ } contract, providing it with an input of the address a of the contract someContract{ }. The function someFunction( ), which performs other functionality of the smart contract (the details of which are omitted for simplicity of illustration and replaced by a comment to "do stuff"), and which may be invoked by a transaction addressed to the contract, performs this functionality conditional upon the output of an invocation of the checkStatus( ) function of the instantiated Court{ } contract, which returns an indication of whether there is a judgment against the contract, such as, e.g., a "1" or "true" for there being a judgment against the contract, and a "0" or "false" for there being no judgment against the contract.

In embodiments, the judgment checking function is or includes a function of the smart contract 40 itself. In embodiments, the judgment checking function 86 includes program instructions to check whether a judgment for the smart contract exits in the judgment database module 60. In one example, the judgment checking function 86 includes one or more predetermined instructions of a programming language in which the smart contract 40 is written that executes a read of the judgment database, such as the judgment database module 60, to determine if it includes a judgment for the smart contract 40. The read can include as input the address of the smart contract 40. The predetermined instruction may be configured in the programming language to execute the read to the judgment database. The predetermined instruction may communicate with the judgment database module 60 via the distributed ledger system interface module 52 of the virtual court server system 28.

Figure 9:
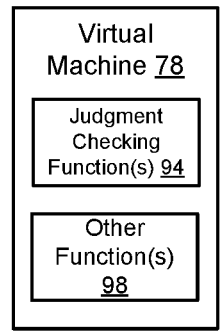
FIG. 9 is a schematic diagram depicting an embodiment of a virtual machine of the distributed node.

In embodiments, the judgment checking function is or includes a function of the virtual machine 78 of the distributed node 66 executing the smart contract 40. FIG. 9 depicts an embodiment of the virtual machine 78 including one or more judgment checking functions 94 and one or more other functions 98. The one or more other functions 98 perform functionality of the virtual machine 78, such as to execute the smart contract 40. The judgment checking function 94 performs functionality to check whether a judgment for the smart contract 40 exits in the judgment database, such as in the judgment database module 60. For example, the judgment checking function 94 may execute a read of the judgment database, such as the judgment database module 60, to determine if it includes a judgment for the smart contract 40. The read can include as input the address of the smart contract 40. The virtual machine may communicate with the judgment database module 60 via the distributed ledger system interface module 52 of the virtual court server system 28.

Returning to FIG. 7, at step 708, it is determined whether a judgment against the contract 40 exists as a function of the output of the execution of the judgment checking function at step 706. The determination is conducted according to the embodiment of the judgment checking function. For embodiments in which the judgment checking function is or includes a function of the smart contract 40, the smart contract 40 may include program instructions that invoke the judgment checking function and output the result. For example, in the above exemplary embodiment of the smart contract someContract{ }, the statement "if(court.checkStatus( . . . )){ . . . }else{ . . . }" determines whether a judgment against the smart contract exists as a function of the output of the checkStatus( ) function of the Court{ } contract. In another example, the smart contract 40 may include a program instruction "if (legalToken( ) {suicide(recipient);}" which invokes a judgment checking function legalToken( ) and takes an action as a result of the output of the function, as discussed further below. For embodiments in which the judgment checking function is a function of the virtual machine 78, the virtual machine may similarly invoke the judgment checking function and taken an action as a function of the output, as discussed further below.

If at step 708, it is determined that a judgment does not exist for the smart contract 40, the method proceeds to step 712. At step 712, execution of the smart contract 40 continues without any intervention. For embodiments in which the judgment checking function is or includes a function of the smart contract 40, the smart contract 40 proceeds to executing the other function(s) 90 of the smart contract 40. For embodiments in which the judgment checking function is or includes a function of the virtual machine 78, the virtual machine proceeds to execute the smart contract 40. In embodiments, continuing execution of the smart contract includes at least one of: conducting a financial transaction between at least two parties by the smart contract, transferring ownership of a digital or physical asset between at least two parties by the smart contract, performing an identification of an individual to authorize access to restricted systems by the smart contract, or triggering by the smart contract an electronic device to generate an electrical signal to control operation of an electrical, mechanical or electromechanical apparatus.

If at step 708, it is determined that a judgment does exist for the smart contract 40, the method proceeds to step 710. At step 710, intervention in the operation of the smart contract 40 is performed to prevent the contract 40 from executing. For embodiments in which the judgment checking function is or includes a function of the smart contract 40, the smart contract 40 may abort operation of the smart contract before other functionality is performed. For example, in the above exemplary embodiment of the smart contract someContract{ }, the statement "if(court.checkStatus( . . . )){ . . . }else{ . . . }" performs the "else{ . . . }" content, which may include nothing, or notification of the legal status, etc. In other embodiments, the smart contract may execute a self destruct function to prevent current and future operation of the smart contract 40. In one example, in the exemplary program instruction above, the program instruction calls a self destruct function "suicide( )" to prevent current and future operation of the smart contract 40. The self destruct function may delete data of the smart contract 40 from the distributed ledger system 24. For embodiments in which the judgment checking function is a function of the virtual machine 78, the virtual machine 78 does not execute and/or stops execution of the smart contract 40. The method ends at step 714.

In embodiments, a method of intervening in the operation of a smart contract based on a judgment for the smart contract may include only any subset of, or an alternative ordering of, the features depicted in or discussed above in regard to FIG. 7.

In embodiments, a method of determining a judgment against a smart contract and/or intervening in the operation of a smart contract based on the judgment may include any combination of the methods of FIGS. 5 and 7, or any combination of any subset and/or alternative ordering of the features of such methods.

As discussed above, in scenarios improved intervention in the operation of a smart contract may be provided by preventing operation of the smart contract in response to a judgment against the contract. However, in some scenarios, a smart contract may execute before any fault, illegality or other problem with the contract is discovered or a judgment against the contract reached. In such scenarios, improved intervention may be provided by remedying the actions that the smart contract may have already taken before a judgment against the contract is determined. For example, for a smart contract that conducts a financial or other transaction that transfer tokens, or other items of value, within the distributed ledger system from one party to another party, a remedying intervention may be provided by transferring, either in whole or in part, the erroneously transferred tokens back to the originating party, as well as complimentary actions.

Figure 10:
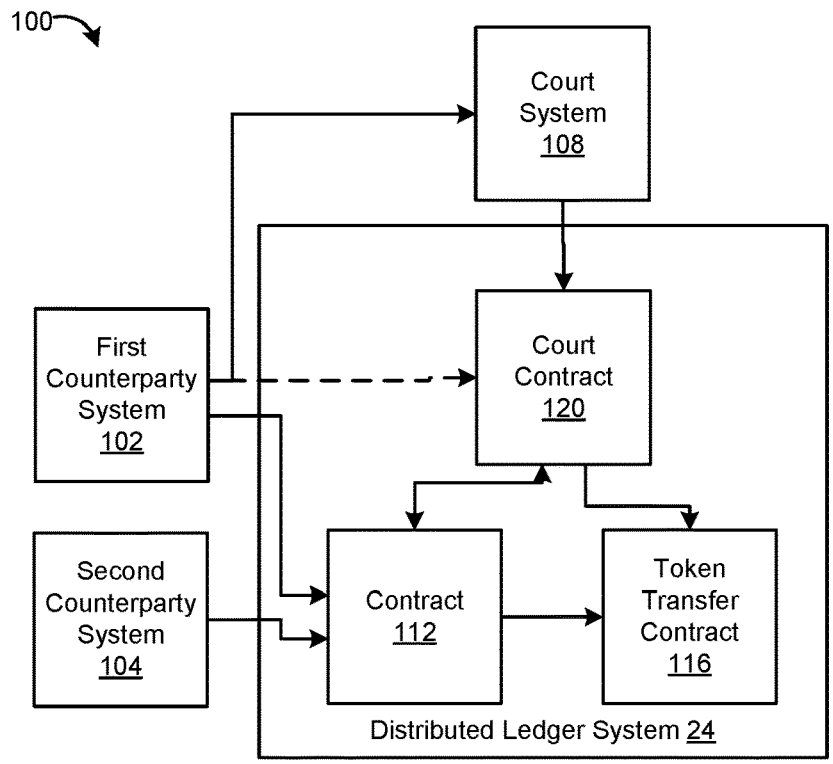
FIG. 10 is a schematic diagram depicting an embodiment of a system for providing improved intervention in the operation of a smart contract in a distributed ledger system.

FIG. 10 depicts an embodiment of a system 100 for providing improved intervention in the operation of a smart contract in a distributed ledger system. The system includes first and second counterparty systems 102, 104, the distributed ledger system 24, and a court system 108. The system 100 of FIG. 10 may be an embodiment of the system 20 of FIG. 1, with the first counterparty system 102 being an embodiment of the complainant system 36, the second counterparty system 104 being an embodiment of the other system 38, the court system 108 being an embodiment of the virtual court server system 28 and the one or more judge systems 32. The first and second counterparty systems 102, 104 are systems of first and second counterparties to a financial or other transaction being conducted using the distributed ledger system 24. The contract 112 conducts the financial or other transaction between the counterparties, the token transfer contract 116 implements token transfers in the distributed ledger system 24, and the court contract 120 implements the intervention in the operation of smart contracts in the distributed ledger system 24.

In embodiments, the system for providing improved intervention in the operation of a smart contract may include only any subset of, or an alternative connection of, the features depicted in or discussed herein in regard to FIG. 10.

Figure 11:
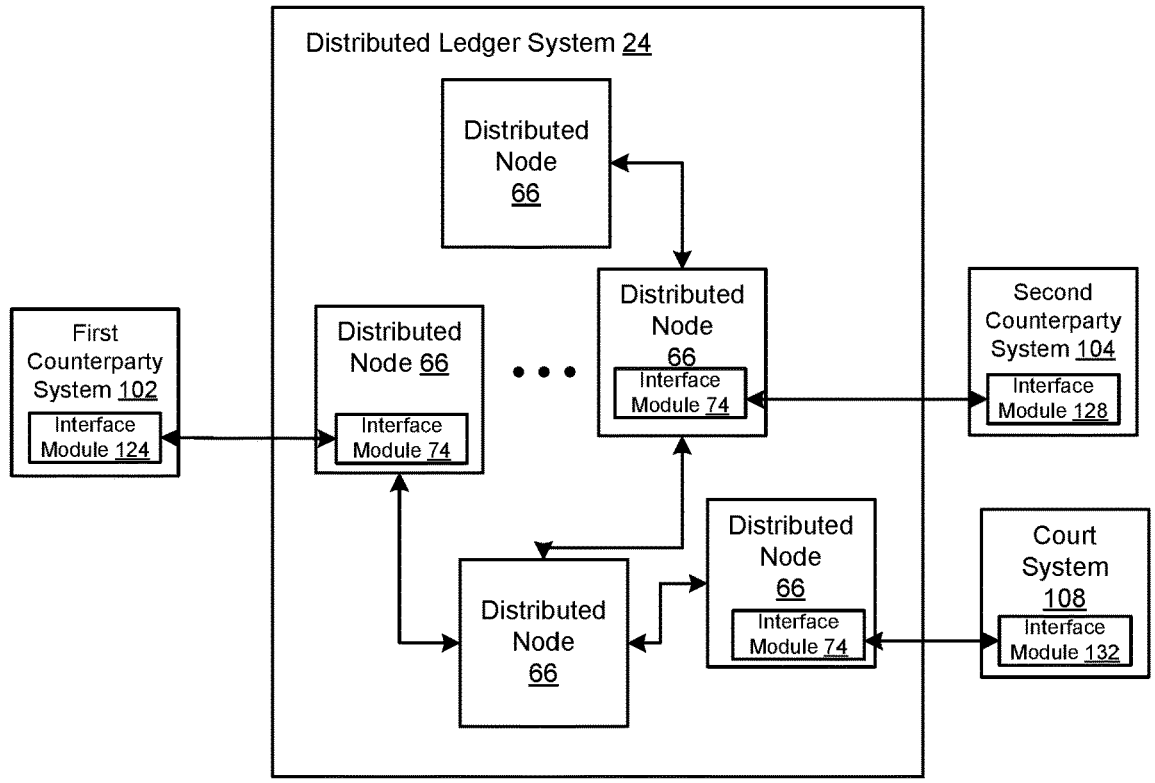
FIG. 11 is a schematic diagram depicting an embodiment of the system for providing improved intervention in the operation of the smart contract in the distributed ledger system.

The depiction of FIG. 10 shows a view of an architecture of smart contracts implemented by the distributed ledger system 24. FIG. 11 depicts another view of the embodiment of the system 100 for providing improved intervention of FIG. 10, showing details of an architecture of the hardware interconnection of the first counterparty system 102, second counterparty system 104, and court system 108 with the distributed ledger system 24. The first and second counterparty systems 102, 104 each include an interface module 124, 128 to communicate, such as via a direct connection or over one or more communication networks, with a communication module 74 of a distributed node 66 of the distributed ledger system 24 to implemented interactions between the first and second counterparty systems 102, 104 and the distributed ledger system 24, such as to implement communications with the contract 112 to conduct a financial or other transaction. The court system 108 likewise includes an interface module 132 to communicate, such as via a direct connection or over one or more communication networks, with the communication module 74 of a distributed node 66 to implemented interactions between the court system 108 and the distributed ledger system 24, such as to implement communications with the court contract 120 to implement an intervention in the operation of the contract 112.

In embodiments, the system for providing improved intervention in the operation of a smart contract may include only any subset of, or an alternative connection of, the features depicted in or discussed herein in regard to FIG. 11.

Figure 12:
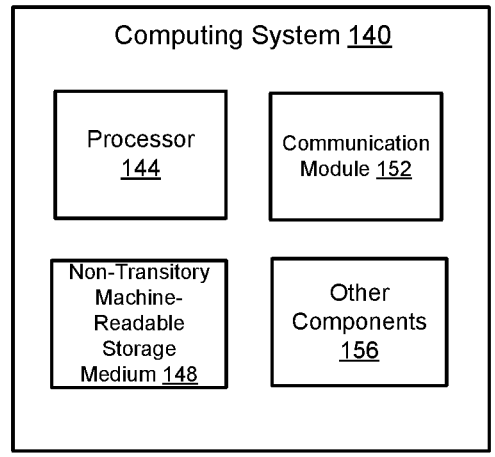
FIG. 12 is a schematic diagram depicting an embodiment of a computer system.

FIG. 12 depicts an embodiment of a computer system 140 that may be used to implement the first counterparty system 102, the second counterparty system 104, the court system 108, the distributed nodes 66 of the distributed ledger system 24, and/or any individual one, subset, or all of the components thereof. The computer system 140 includes a processor 144, a non-transitory machine-readable storage medium 148, a communication circuit 152, and optionally other components 156. The processor 144 executes program instructions stored in the non-transitory machine-readable storage medium 148 to perform the functionality of the component it is implementing as discussed herein. The communication circuit 152 can be controlled by the processor 144 to communicate with other devices, such as others of the first counterparty system 102, the second counterparty system 104, the court system 108, and/or the distributed nodes 66 of the distributed ledger system 24, to perform the functionality of the component it is implementing as discussed herein. The optional other components 156 may include any further components required by the computer system 140 to perform this functionality.

In embodiments, a computer system that may be used to implement the first counterparty system 102, the second counterparty system 104, the court system 108, the distributed nodes 66 of the distributed ledger system 24, and/or any individual one, subset, or all of the components thereof may include only any subset of, or an alternative connection or ordering of, the features depicted in or discussed herein in regard to FIG. 12.

Figure 13:
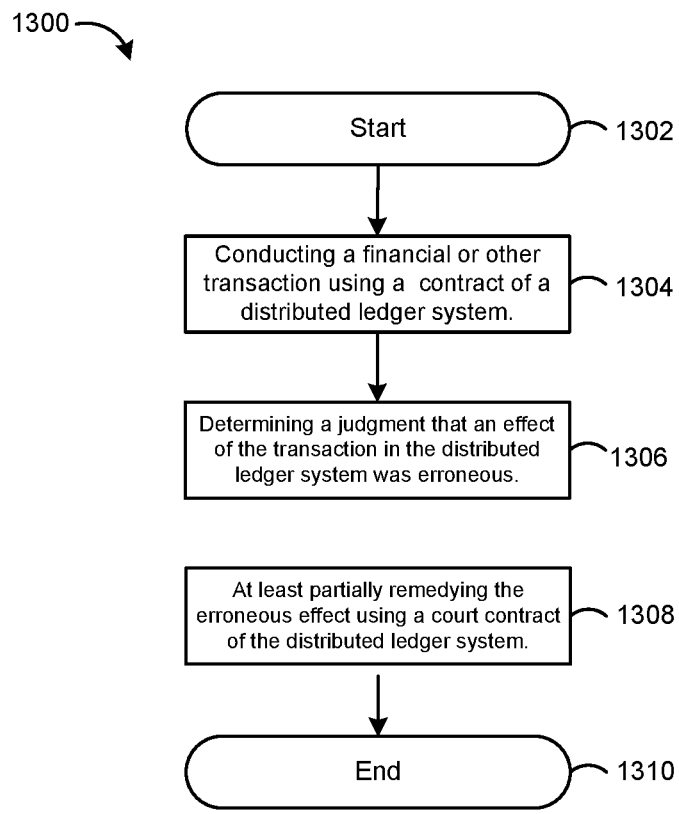
FIG. 13 is a flowchart depicting an embodiment of a method of intervening in the operation of the smart contract.

FIG. 13 depicts an embodiment of a method 1300 of intervening in the operation of a smart contract. The method may be performed by or involving components of the system 100 for providing improved intervention of FIGS. 10 and 11. The method of intervening in the operation of the smart contract remedies actions that the smart contract may have already taken before any judgment against the contract is determined, thereby improving the accuracy and performance of contracts within the distributed ledger system 24, and the distributed ledger system 24 as a whole, by eliminating or reducing erroneous effects caused by smart contracts containing a fault, illegality or other problem. The method 1300 begins at step 1302.

At step 1304, a financial or other type of transaction is conducted using a smart contract of the distributed ledger system 24. The financial or other transaction may be conducted using the contract 112 of the distributed ledger system 24. The contract 112 may be any contract of the distributed ledger system configured to conduct the financial or other type of transaction between parties. The parties to the transaction may be the first counterparty and the second counterparty. The financial or other transaction may be initiated by the first and second counterparties engaging the contract 112 to conduct the financial or other transaction, such as by the first and second counterparty systems 102, 104 each transmitting a transaction, or executing a call, to the contract 112 to request and/or authorize the conducting of the financial or other transaction.

Note that, as used herein, "transaction" as in "conducting a financial or other transaction" refers to the action of implementing a financial or other transaction between parties, such as the sale of a financial commodity, the implementation of an interest or dividend payment for a financial commodity, etc.; while "transaction" as in "generating and transmitting a transaction to a smart contract" refers to the act of generating and transmitting a piece of data called a transaction in the distributed ledger system to a distributed node of the distributed ledger system to initiate execution of a smart contract.

Conducting the financial or other transaction by the contract 112 may include transferring tokens or other commodities of value within the distributed ledger system 24 between parties to the financial or other transaction. Tokens are units of value stored as data structures in the ledger of the distributed ledger system 24, which may be a type of currency within the distributed ledger system 24, and may be configured to represent value in various ways. For example, tokens may be configured to have a mathematical relationship to real-world currency, such as X tokens equal Y dollars, where X and Y can be selected to implement the relationship. The financial or other transaction may transfer tokens for a variety of purposes related to the nature of the transaction. For example, for a transaction performing a purchase of a financial commodity, such as a stock or bond, etc., the transaction may include transferring of tokens representing payment of the price of the financial commodity. For a transaction performing an interest or dividend payout from a financial commodity, such as a stock or bond, etc., the transaction may include transferring of tokens representing payment of the interest or dividend.

The contract 112 may transfer tokens using another contract of the distributed ledger system 24 configured to perform token transfers for contracts. In the embodiment of FIG. 10, the token transfer contract 116 is a contract configured to perform token transfers for other contracts, and the contract 112 may use the token transfer contract 116 to perform token transfers. The contract 112 may execute a token transfer using the token transfer contract 116 by generating and transmitting a transaction, or executing a call, to the token transfer contract 116 to request the token transfer. The transaction or call to the token transfer contract 116 includes identification of an account in the distributed ledger system 24 of the party from whom the tokens will be transferred (such as, e.g., an account of the first counterparty), an account in the distributed ledger system 24 of the party to whom the tokens will be transferred (such as, e.g., an account of the second counterparty), and the number of tokens to be transferred. An account within the distributed ledger system 24 may be represented and/or identified by an address in the distributed ledger system 24. In other embodiments, the contract 112 may itself include a token transfer functionality, which it may use to execute the token transfer.

Below are exemplary program instructions illustrating an example embodiment of a token transfer function of the token transfer contract 116:

```
function transfer(address _to, uint256 _amount) returns (bool success) {
    if (balances[msg.sender] >= _amount
    && _amount > 0
    && balances[_to] + _amount > balances[_to]) {
        balances[msg.sender] -= _amount;
        balances[_to] += _amount;
        return true;
    } else {
        return false;
    }
}
```

The exemplary function transfer( ) checks if the balance of the invoker msg.sender of the function is greater than an indicated amount_amount to be transferred, and, if so, the amount to be transferred is transferred to an indicated address_to in the distributed ledger system 24.

Other embodiments of a transfer function may include different specific program instructions.

At step 1306, a determination of a judgment that the operation of the contract 112 includes an illegality, fault contrary to the intended operation of the contract 112, or other problem is conducted. The determination of the judgment may be conducted by or involving the court system 108, the court contract 120, and a system of a party acting as the complainant, such as the first counterparty system 102. In embodiments, the determination may be performed using embodiments of the method of FIG. 5. For example, the determination of the judgment may be performed by performing steps 504 to 510 of the method of FIG. 5, i.e., the court system 108, such as the virtual court server system 28, may receive a complaint regarding the smart contract 112 from a complainant, such as from the first counterparty system 102; the virtual court server system 28 may receive input regarding the complaint from the one or more judges, such as from the one or more judge systems 32; the court system 108, such as the virtual court server system 28, may determine a judgment of the complaint based on the received input; and the court system 108, such as the virtual court sever system 28, may record the determined judgment in the judgment database, such as the judgment database module 60 or a data store 85 of the court contract 120. In other embodiments, instead of or in addition to the first counterparty system 102 providing the complaint to the court system 108, the first counterparty system 102 may transmit a transaction, or execute a call, to the court contract 120 including the complaint, and the court system 108 may retrieve the complaint from a data structure of the court contract 120.

The determination of the judgment may include a specific determination that an effect of the financial or other transaction conducted by the contract 112 is in error. For example, the determination of the judgment may determine that a quantity of tokens transferred as part of the financial or other transaction conducted using the contract 112 were transferred in error. An erroneous token transfer may arise in a variety of ways. The contract 112 may include a logical, data or other programming error that causes it to transfer a quantity of tokens that is not the quantity of tokens intended by the parties to be transferred. For example, a contract intended to implement an interest payment of 1%, which may take the form of a number of tokens Z, may include an error that causes it to instead implement an interest payment of 10%, which may take the form of a number of tokens 10*Z.

At step 1308, the effect of the financial or other transaction determined to be in error is at least partially remedied. The remedying of the effect of the financial or other transaction determined to be in error may be performed by or involving the court system 108 and the court contract 120. The remedying of the effect of the financial or other transaction determined to be in error may include remedying any specific effect identified by the judgment determination, such as an erroneous transfer of a quantity of tokens. The remedying may be conducted by the court system 108 engaging the court contract 120 to perform the remedying, such as by the court system 108 transmitting a transaction, or executing a call, to the court contract 120 to request the remedying. The transaction or call to the court contract 120 may identify the effect to be remedied and the parties involved in the remedy. For example, for an erroneous transfer of tokens, the transaction or call may identify an account in the distributed ledger system 24 of the party from whom the tokens will be transferred (e.g., the account to whom the tokens were transferred in error), an account in the distributed ledger system 24 of the party to whom the tokens will be transferred (e.g., the account from whom the tokens were transferred in error), and the quantity of tokens to be transferred for the remedy (e.g., the quantity of tokens transferred in error).

The court contract 120 may implement the remedy using another contract of the distributed ledger system 24. For remedying an erroneous transfer of tokens, the court contract 120 may transfer tokens using the token transfer contract 116. Typically, token transfers within a distributed ledger system 24 are only possible when the transfer request comes from the account from which the tokens are to be transferred, to prevent unauthorized token transfers. In the present system, however, the token transfer contract 116 may include a token transfer function configured to allow token transfers originating from the court contract 120, referred to herein as a court transfer function, even though the account of the court contract 120 may be different from the account from which the remedying token transfer is to be drawn. The operators of the distributed ledger system 24 may find this acceptable, as the court contract 120 is a contract administered and operated by the court system 108, which is a trusted entity. The court contract 120 may execute a token transfer using the token transfer contract 116 by generating and transmitting a transaction, or executing a call, to the token transfer contract 116 to request the court token transfer function. For example, for an erroneous transfer of tokens, the transaction or call may identify the court token transfer function, an account in the distributed ledger system 24 of the party from whom the tokens will be transferred (e.g., the account to whom the tokens were transferred in error), an account in the distributed ledger system 24 of the party to whom the tokens will be transferred (e.g., the account from whom the tokens were transferred in error), and the quantity of tokens to be transferred for the remedy (e.g., the quantity of tokens transferred in error).

Below are exemplary program instructions illustrating an example embodiment of a court token transfer function of the token transfer contract 116:

```
// Hard-coded address of the court contract
address court = 0x53d5747E734d6c2E0BF96C4e81f54409D6148a7c;
function courtTransfer(address __from, address __to, uint256
__amount) returns (bool success) {
    // Check if the court is intervening and moving the tokens
    // They are moved from address __from (counterparty A)
    // to address __to (counterparty B)
        if(msg.sender == court){
            if (balances[__from] >= __amount
            && __amount > 0
            && balances[__to] + __amount > balances[__to]) {
                balances[__from] -= __amount;
                balances[__to] += __amount;
                return true;
            } else {
                return false;
            }
        }
    }
```

The exemplary function courtTransfer( ) checks if the invoker of the function msg.sender is the court, then if so, checks whether the balance associated with an indicated address_from, from where the tokens are to be transferred, is greater than the indicated amount_amount to be transferred, and if so, transfers the amount to an indicated address_to, to which the amount is to be transferred.

Other embodiments of a court transfer function may include different specific program instructions.

In embodiments, a method of intervening in the operation of a smart contract may include only any subset of, or an alternative ordering of, the features depicted in or discussed above in regard to FIG. 13.

Figure 14:
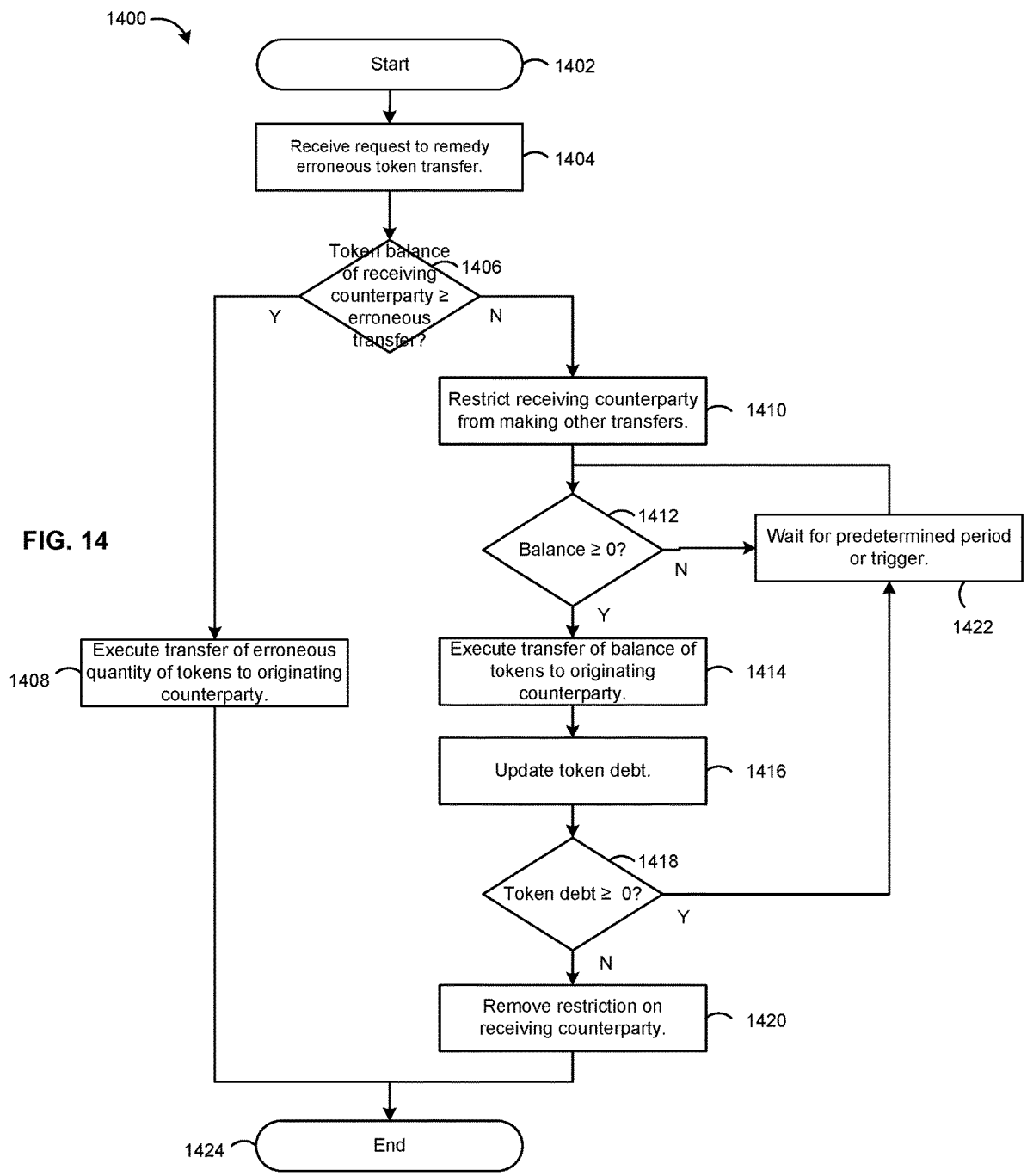
FIG. 14 is a flowchart depicting an embodiment of a method of intervening in the operation of the smart contract.

FIG. 14 depicts an embodiment of another method 1400 of intervening in the operation of a smart contract. In embodiments, the method of FIG. 14 may be used to perform the remedying step 1308 of the method of FIG. 13. The method may be performed by or involving components of the system 100 for providing improved intervention of FIGS. 10 and 11, such as by the court contract 120 of the distributed ledger system 24. The method of intervening in the operation of the smart contract remedies actions that the smart contract may have already taken before any judgment against the contract is determined, thereby improving the accuracy and performance of contracts within the distributed ledger system 24, and the distributed ledger system 24 as a whole, by eliminating or reducing erroneous effects caused by smart contracts containing a fault, illegality or other problem. The method 1400 begins at step 1402.

At step 1404, a request to remedy an erroneous token transfer performed as part of a financial or other transaction conducted in the distributed ledger system 24 is received. The request may be received by the court contract 120 from the court system 108. The court system 108 may execute the request by generating and transmitting a transaction, or executing a call, to the court contract 120 to request the remedying action. The transaction or call to the court contract 120 may include identification of the account in the distributed ledger system 24 of the party from whom the tokens will be transferred (e.g., the account that received the erroneous transfer), an account in the distributed ledger system 24 of the party to whom the tokens will be transferred (e.g., the account from which the erroneous transfer originated), and the number of tokens to be transferred (e.g., the amount of tokens erroneously transferred).

At step 1406, a check is conducted of whether the balance of the account from where the remedying transfer is to be taken is greater than or equal to the amount of tokens to be transferred as a remedy. The check may be conducted by the court contract 120 executing program logic to determine the balance and compare the determined balance to the indicated amount of tokens to be transferred as a remedy.

If at step 1406, the balance is greater than or equal to the amount of tokens to be transferred as a remedy, the method proceeds to step 1408, where the entire amount of tokens to be remedied is transferred from the indicated account owing the tokens to the indicated account from which the erroneous transfer originated. The court contract 120 may execute the transfer by generating and transmitting a transaction, or executing a call, to the token transfer contract 116 to request the transfer. The transaction or call to the transfer contract 116 may include identification of the account in the distributed ledger system 24 of the party from whom the tokens will be transferred, the account in the distributed ledger system 24 of the party to whom the tokens will be transferred, and the number of tokens to be transferred.

As discussed above, to overcome the limitation of transfer functions only transferring tokens from an account that calls the function, and to preserve the prevention of unauthorized transfer of tokens, the token transfer contract 116 may include a court transfer function responsive only to the court contract 120 for implementing remedying transfers. One embodiment of such a court transfer function is discussed above, while a further embodiment is discussed below. In embodiments, the court contract 120 itself may include a court transfer function responsive only to the court contract 120 for implementing remedying transfers.

However, if at step 1406, the balance is less than the amount of tokens to be transferred as a remedy, the method proceeds along a course to provide one or both of a partial remedy or continuing remedy actions. For example, the method proceeds to step 1410, where a restriction is placed on the account receiving the erroneous transfer that prevents that account from making any transfers other than to the account from which the erroneous transfer was made. The restriction may be placed on the account in a variety of ways. In one example, a list of accounts that owe tokens erroneously transferred to them may be maintained, such as by the transfer contract 116, and the transfer function of the transfer contract 116 may consult the list before conducting a transfer of tokens, with the transfer function not conducting the transfer if the account attempting to transfer tokens is on the list. In another example, an outstanding debt of erroneously transferred tokens may be maintained for an account that erroneously received tokens, and the transfer function of the transfer contract 116 may consult the outstanding debt before conducting a transfer of tokens from that account, with the transfer function not conducting the transfer until the outstanding debt is zero.

Below are exemplary program instructions illustrating another example embodiment of a court token transfer function, a token transfer function, and a restriction function of a token transfer contract:

```
// Hard-coded address of the court contract
address court = 0x53d5747E734d6c2E0BF96C4e81f54409D6148a7c;
mapping (address => uint256) balances;
mapping (address => uint256) outstanding;
mapping (address => bool) blacklist;
function courtTransfer(address _from, address _to, uint256 _amount) public returns (bool success) {
    // Check if the court is intervening and moving the tokens
    // They are moved from address _from (counterparty A)
    // to address _to (counterparty B)
    if(msg.sender == court){
        if (balances[_from] >= _amount && _amount > 0 && balances[_to] + _amount > balances[_to]) {
            balances[_from] -= _amount;
            balances[_to] += _amount;
            return true;
        // Case 1 - insufficient balance
        // Keep track of remaining debt in outstanding map
        }else if (balances[_from] < _amount && _amount > 0){
            balances[_to] += balances[_from];
            outstanding[_from] = _amount - balances[_from];
            balances[_from] = 0;
            return true;
        } else {
            return false;
        }
    }
}
function transfer(address _to, uint256 _amount) public returns (bool success) {
    // Case 2 - prevent transfers unless outstanding amount is zero
    // Case 3 - check if msg.sender is on blacklist
    if (balances[msg.sender] >= _amount && _amount > 0 && balances[_to] + _amount > balances[_to] && outstanding[msg.sender] == 0 && !blacklist[msg.sender]) {
        balances[msg.sender] -= _amount;
        balances[_to] += _amount;
        return true;
    } else {
        return false;
    }
}
function updateBlacklist(address _address, bool _status) public returns (bool success) {
    if(msg.sender == court){
        blacklist[_address] = _status;
        return true;
    }else{
        return false;
    }
}
```

The exemplary restriction function updateBlacklist( ) maintains a list of accounts of the distributed ledger system that owe tokens erroneously transferred to them (e.g., via the instruction: blacklist[_address]=_status), and the exemplary transfer function transfer( ) checks the maintained list (e.g., via the instruction: if ( . . . !blacklist[msg.sender])), and only performs a requested transfer if the invoker of the transfer msg.sender is not on the maintained list. Also, the exemplary court transfer function courtTransfer( ) maintains an outstanding amount of erroneously transferred tokens still owed by an account that erroneously received tokens as the tokens are partially transferred back to the originating account (e.g., via the instruction: outstanding[_from]=_amount−balances [_from]), and the transfer function transfer( ) consults the outstanding debt before conducting a transfer of tokens (e.g., via the instruction: if ( . . . outstanding[msg.sender]== 0 . . . )), with the transfer function not conducting the transfer until the outstanding debt is zero.

Other embodiments of a restriction function, a transfer function, and a court transfer function may include different specific program instructions.

Returning to FIG. 14, at step 1412, a check is conducted of whether the balance of the account from where the remedying transfer is to be taken is greater than zero. The check may be conducted by a contract, such as the court contract 120 or transfer contract 116, executing program logic to determine the balance of the account and comparing the determined balance to zero.

If at step 1412, the balance is greater than zero, the method proceeds to step 1414, where the existing balance is transferred from the indicated account owing the debt to the indicated account from which the erroneous transfer originated. The court contract 120 may execute the transfer by generating and transmitting a transaction, or executing a call, to the token transfer contract 116 to request the transfer. The transaction or call to the transfer contract 116 may include identification of the account in the distributed ledger system 24 of the party from whom the debt will be transferred, the account in the distributed ledger system 24 of the party to whom the tokens will be transferred to remedy the erroneous transfer, and the number of tokens to be transferred.

At step 1416, the outstanding debt of tokens of the account receiving the erroneously transferred tokens is updated to reflect the transfer of tokens conducted at step 1414. The updating may be conducted by a contract, such as the court contract 120 or transfer contract 116, executing program logic to calculate the outstanding debt as a previous outstanding debt minus the amount of tokens transferred at step 1414.

At step 1418, a check is conducted of whether the outstanding debt of erroneously transferred tokens is greater than zero. The check may be conducted by a contract, such as the court contract 120 or transfer contract 116, executing program logic to compare the outstanding determined at step 1416 to zero.

If at step 1418, the outstanding debt is not greater than zero, the method proceeds to step 1420, where the restriction on the account that received the erroneous transfer from making any transfers other than remedying transfers is removed. The restriction may be removed from the account in a variety of ways. In one example, where a list of accounts that owe tokens erroneously transferred to them is maintained, such as by the court contract 120 or the transfer contract 116, as discussed above, the restriction may be removed by removing the account from this list. In another example, where an outstanding debt of erroneously transferred tokens is maintained for an account that erroneously received tokens, the restriction may be removed by this debt reaching zero and any conditions placed on this debt being greater than zero likewise being removed or evaluating in manner to permit transfers.

If at step 1418, the outstanding debt is greater than zero, the method proceeds to step 1422, where the method waits for the passage of a predetermined period of time or until a predetermined trigger occurs, upon which the method proceeds back to step 1412. By waiting for the predetermined period of time or trigger, and then rechecking the balance of the account owing the debt of erroneously transferred tokens, the method is able to conduct an ongoing remedial action to detect and then transfer out any tokens newly accumulated by the account. The predetermined trigger may take a variety of forms, such as the creation of a new ledger structure in the distributed ledger system, e.g., the creation of a new block in a blockchain-based distributed ledger system. The method ends at step 1424.

In embodiments, a method of intervening in the operation of a smart contract may include only any subset of, or an alternative ordering of, the features depicted in or discussed above in regard to FIG. 14.

Figure 15:
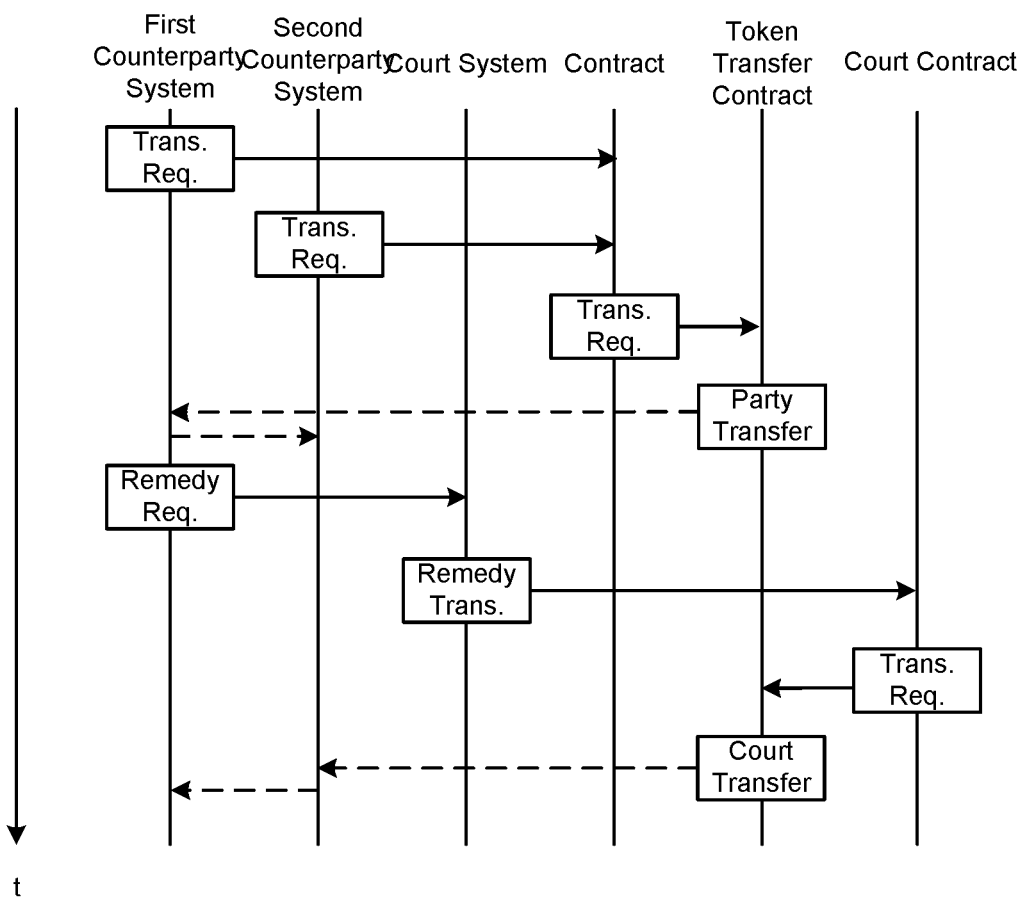
FIG. 15 is a diagram depicting an embodiment of function and data flows of a method of intervening in the operation of the smart contract.

FIG. 15 is a diagram showing an embodiment of function and data flows of the methods of FIGS. 13 and 14. In first and second events, the first and second counterparty systems 102, 104 generate and transmit transactions to the contract 112 to initiate and/or authorize the contract 112 to conduct the financial or other transaction. In a third event, the contract 112 generates and transmits a transaction to the transfer contract 116 to initiate and/or authorize the transfer contract 116 to conduct a token transfer between accounts of the first and second counterparties as part of the financial or other transaction. In a fourth event, the transfer contract 116 conducts the token transfer between the accounts of the first and second counterparties as part of the financial or other transaction. In a fifth event, upon discovering an illegality, unintended aspect or other problem with the conducting of the token transfer for the financial or other transaction, the first counterparty system 102 transmits a request to the court system 108 for a judgment against the contract 112. In a sixth event, upon determining a judgment against the contract 112, the court system 108 generates and transmits a transaction to the court contract 120 to request remedial action against the contract 112. In a seventh event, the court contract 120 generates and transmits a transaction to the transfer contract 116 to initiate and/or authorize the transfer contract to conduct a remedial token transfer or other action between accounts of the first and second counterparties. In an eighth event, the transfer contract 116 conducts the remedial token transfer or other action between the accounts of the first and second counterparties. Other embodiments of function and data flows may include additional and/or different function and data flow events.

In embodiments, function and data flows of a method of intervening in the operation of a smart contract may include only any subset of, or an alternative ordering of, the features depicted in or discussed above in regard to FIG. 15.

Additional embodiments of the virtual court server system 28, judge system(s) 32, complainant system 36, distributed ledger system 24, other system(s) 38, first counterparty system 102, second counterparty system 104, court system 108, and associated methods 500, 700, 1300, 1400 of intervening in the operation of a smart contract, as discussed herein, are possible. For example, any feature of any of the embodiments of these systems and methods described herein may be used in any other embodiment of these systems and methods. Also, embodiments of these systems and methods may include only any subset of the components or features of these systems and methods discussed herein.

What is claimed is:

1. A method of remedying an erroneous transaction in a distributed ledger system, the method comprising:
   determining, by a court system associated with the distributed ledger system, a judgment that a transfer by a token transfer smart contract, while conducting the transaction, of a quantity of tokens of the distributed ledger system from a first account of the distributed ledger system to a second account of the distributed ledger system is erroneous; and
   in response to determining the judgment:
      determining, by a court smart contract of the distributed ledger system, a balance of tokens of the second account, the court smart contract including program instructions stored in a ledger of the distributed ledger system;
      in response to determining that the balance of the second account is less than the quantity of tokens erroneously transferred, executing, by the court smart contract, a restriction function of the token transfer smart contract to prevent transfers of tokens from the second account other than by the court smart contract; and
      executing, by the court smart contract, a transfer function of the token transfer smart contract, the token transfer smart contract including program instructions stored in the ledger of the distributed ledger system, the transfer function configured to be responsive to the court smart contract, to transfer at least a portion of the quantity of tokens from the second account to the first account.

2. The method of claim 1, further comprising receiving, by the court smart contract, a distributed ledger system transaction including a request from the court system, the request indicating the first and second accounts, and the quantity of tokens erroneously transferred.

3. The method of claim 1, further comprising, in response to determining that the balance of the second account is greater than or equal to the quantity of tokens erroneously transferred, executing, by the court smart contract, the court transfer function to transfer the quantity of tokens from the second account to the first account.

4. The method of claim 1, further comprising, in response to determining that the balance of the second account is less than the quantity of tokens erroneously transferred, but greater than zero, executing, by the court smart contract, the court transfer function to transfer the balance of tokens from the second account to the first account.

5. The method of claim 4, further comprising updating, by the court smart contract, a debt of erroneously transferred tokens of the second account to be the quantity of tokens erroneously transferred minus the transferred balance of tokens.

6. The method of claim 1, further comprising executing, by the court smart contract, a restriction function to prevent transfers of tokens from the second account other than by the court smart contract.

7. The method of claim 1, further comprising:
   determining, by the court smart contract, that a predetermined period of time has passed since a previous checking of the balance of the second account; and
   in response to determining that the predetermined period of time has passed, redetermining, by the court smart contract, the balance of tokens of the second account.

8. The method of claim 1, further comprising conducting the transaction, including transferring, using a smart contract of the distributed ledger system, the quantity of tokens from the first account to the second account.

9. The method of claim 1, wherein the restriction function stores a list of accounts of the distributed ledger system that owe tokens erroneously transferred to them, and the token transfer smart contract reads the list before conducting any transfer of tokens.

10. A system for remedying an erroneous transaction, the system comprising:
at least one non-transitory machine readable storage medium storing program instructions; and
at least one processor configured to execute the program instructions to perform a method of remedying the erroneous transaction in a distributed ledger system, the method including:
determining, by a court system associated with the distributed ledger system, a judgment that a transfer by a token transfer smart contract, while conducting the transaction, of a quantity of tokens of the distributed ledger system from a first account of the distributed ledger system to a second account of the distributed ledger system is erroneous; and
in response to determining the judgment:
determining, by a court smart contract of the distributed ledger system, a balance of tokens of the second account, the court smart contract including program instructions stored in a ledger of the distributed ledger system;
in response to determining that the balance of the second account is less than the quantity of tokens erroneously transferred, executing, by the court smart contract, a restriction function of the token transfer smart contract to prevent transfers of tokens from the second account other than by the court smart contract; and
executing, by the court smart contract, a transfer function of the token transfer smart contract, the token transfer smart contract including program instructions stored in the ledger of the distributed ledger system, the transfer function configured to be responsive to the court smart contract, to transfer at least a portion of the quantity of tokens from the second account to the first account.

11. The system of claim 10, the method further comprising receiving, by the court smart contract, a distributed ledger system transaction including a request from the court system, the request indicating the first and second accounts, and the quantity of tokens erroneously transferred.

12. The system of claim 10, the method further comprising, in response to determining that the balance of the second account is greater than or equal to the quantity of tokens erroneously transferred, executing, by the court smart contract, the court transfer function to transfer the quantity of tokens from the second account to the first account.

13. The system of claim 10, the method further comprising, in response to determining that the balance of the second account is less than the quantity of tokens erroneously transferred, but greater than zero, executing, by the court smart contract, the court transfer function to transfer the balance of tokens from the second account to the first account.

14. The system of claim 13, the method further comprising updating, by the court smart contract, a debt of erroneously transferred tokens of the second account to be the quantity of tokens erroneously transferred minus the transferred balance of tokens.

15. The system of claim 10, the method further comprising executing, by the court smart contract, a restriction function to prevent transfers of tokens from the second account other than by the court smart contract.

16. The system of claim 10, the method further comprising conducting the transaction, including transferring, using a smart contract of the distributed ledger system, the quantity of tokens from the first account to the second account.

17. At least one non-transitory machine readable storage medium having program instructions, which when executed by at least one processor perform a method of remedying an erroneous transaction in a distributed ledger system, the method including:
determining, by a court system associated with the distributed ledger system, a judgment that a transfer by a token transfer contract, while conducting the transaction, of a quantity of tokens of the distributed ledger system from a first account of the distributed ledger system to a second account of the distributed ledger system is erroneous; and
in response to determining the judgment:
determining, by a court smart contract of the distributed ledger system, a balance of tokens of the second account, the court smart contract including program instructions stored in a ledger of the distributed ledger system;
in response to determining that the balance of the second account is less than the quantity of tokens erroneously transferred, executing, by the court smart contract, a restriction function of the token transfer smart contract to prevent transfers of tokens from the second account other than by the court smart contract; and
executing, by the court smart contract, a transfer function of the token transfer smart contract, the token transfer smart contract including program instructions stored in the ledger of the distributed ledger system, the transfer function configured to be responsive to the court smart contract, to transfer at least a portion of the quantity of tokens from the second account to the first account.

18. The non-transitory machine readable storage medium of claim 17, the method further comprising:
in response to determining that the balance of the second account is greater than or equal to the quantity of tokens erroneously transferred, executing, by the court smart contract, the court transfer function to transfer the quantity of tokens from the second account to the first account;
in response to determining that the balance of the second account is less than the quantity of tokens erroneously transferred, but greater than zero, executing, by the court smart contract, the court transfer function to transfer the balance of tokens from the second account to the first account; and
executing, by the court smart contract, a restriction function to prevent transfers of tokens from the second account other than by the court smart contract.

19. The non-transitory machine readable storage medium of claim 17, the method further comprising conducting the transaction, including transferring, using a smart contract of the distributed ledger system, the quantity of tokens from the first account to the second account.

* * * * *